(12) United States Patent
Kawachi et al.

(10) Patent No.: US 6,357,919 B1
(45) Date of Patent: Mar. 19, 2002

(54) PLAIN BEARING

(75) Inventors: Toshiaki Kawachi; Hideo Tsuji; Hideo Ishikawa; Takayuki Shibayama, all of Nagoya (JP)

(73) Assignee: Daido Metal Company, Ltd., Nagoya (JP)

( * ) Notice: Subject to any disclaimer, the term of this patent is extended or adjusted under 35 U.S.C. 154(b) by 0 days.

(21) Appl. No.: 09/583,557

(22) Filed: May 31, 2000

(30) Foreign Application Priority Data

Jun. 9, 1999 (JP) .............................. 11-162347

(51) Int. Cl.$^7$ .............................................. F16C 33/06
(52) U.S. Cl. ........................ 384/276; 384/913
(58) Field of Search ................... 384/276, 282, 384/294, 912, 913

(56) References Cited

U.S. PATENT DOCUMENTS 5,730,097 A * 3/1998 Aoyama ................ 384/278 X
5,911,513 A * 6/1999 Tsuji et al. .................. 384/276
6,025,081 A * 2/2000 Ohshiro et al. ......... 384/912 X

FOREIGN PATENT DOCUMENTS

| GB | 597113 | 7/1998 |
| GB | 2 321 468 | 7/1998 |
| JP | 4-2739 | 1/1992 |
| JP | 10-330871 | 12/1998 |

* cited by examiner

Primary Examiner—Thomas R. Hannon
(74) Attorney, Agent, or Firm—Browdy and Neimark P.L.L.C.

(57) ABSTRACT

A plain bearing comprising a back metal layer, a bearing alloy layer and an overlay which coats the bearing alloy layer. The overlay is made of a lead-free tin-base alloy which comprises from more than 2 wt % to 10 wt % Ag. The lead-free tin-base alloy may further comprise 0.1 wt % to 25 wt % of one or more elements selected from a group consisting of Cu, Sb, Zn and Ni.

9 Claims, 1 Drawing Sheet

PLAIN BEARING

BACKGROUND OF THE INVENTION

The present invention relates to a plain bearing, more particularly to the plain bearing for internal combustion engines.

There has been known a plain bearing comprising a back metal layer, a bearing alloy layer made of a copper alloy or an aluminum alloy, and an overlay which is provided on the bearing alloy layer in order to enhance conformability and foreign-matter embeddability of the bearing.

There has been also well known an overlay Pb-base alloy comprising Sn and In. For example, JP-A-4-2739 teaches a tin-base alloy comprising 0.1 to 25 wt % In. According to the publication, the tin-base alloy has excellent corrosion resistance derived from Sn and can solve the problems of tin which lacks conformability and affinity for oil and which has a high coefficient of friction.

Recently, however, a lead-free plain bearing is sought as a countermeasure against the environmental problems, so that an alternative overlay made of a lead-free alloy is sought. On the other hand, regarding internal combustion engines, there is a recent trend that they are provided with a high performance of high speed and high load, so that a plain bearing especially having excellent properties of anti-seizure and fatigue resistance is highly sought.

It has been generally known that the tin-base alloy overlay has excellent corrosion resistance in comparison with the lead-base alloy overlay but the former is inferior in anti-seizure and fatigue resistance properties than the latter. It is also noted that the Sn-In alloy disclosed in JP-A-4-2739 has a considerably low melting point because of the additive alloying element of In (indium), so that the Sn-In alloy will not be so suitable for plain bearings of internal combustion engines, which are used under a high temperature of around 130° C. to 150° C., because of rather unsatisfactory anti-seizure and fatigue resistance properties.

BRIEF SUMMARY OF THE INVENTION

Thus, it is an object of the invention to provide an overlay for plain bearings, which has excellent high temperature properties of anti-seizure and fatigue resistance.

According to the present invention, there is provided a plain bearing comprising a back metal layer, a bearing alloy layer and an overlay which coats the bearing alloy layer, wherein the overlay is made of a lead-free tin-base alloy which comprises, by weight, from more than 2% to 10% Ag. The plain bearing has excellent anti-seizure and fatigue resistance properties. The bearing alloy layer may be of known bearing alloys including copper alloys and aluminum alloys. The plain bearing can be lead-free in the case where the bearing alloy layer is made of a lead-free alloy.

Regarding the chemical composition of the overlay alloy, if the Ag amount is not more than 2 wt %, the above advantageous effects of excellent anti-seizure and fatigue resistance properties can not be obtained. The overlay alloy is the most excellent at an amount of about 3 wt % Ag with respect to anti-seizure and fatigue resistance properties. If the Ag amount is increased over the level of about 3 wt %, the both properties are gradually deteriorated corresponding to the increased level and extremely deteriorated at an Ag amount of more than 10 wt %. Therefore the Ag amount is desirably 2.5 wt % to 5 wt %.

The overlay may be formed on the bearing alloy layer directly or through an inter layer made of Ni or Ag in order to avoid occurrence of the mutual diffusion or bonding problem between the bearing alloy layer and the overlay.

The overlay may optionally comprise other alloying elements than Ag in order to further improve mechanical properties thereof, especially fatigue resistance. Such alloying elements may be preferably Cu, Sb, Zn, Ni and so on because the melting point of the overlay is not lowered thereby.

The overlay may also optionally comprise hard particles such as nitrides, carbides or oxides in order to improve wear resistance property, or solid lubricants such as $MoS_2$, BN, graphite, PTFE and so on in order to decrease the coefficient of friction.

The invention plain bearing is excellent in high temperature properties of anti-seizure and fatigue resistance, and especially suitable for internal combustion engines.

Herein below a detailed description will be provided with regard to invention and comparative examples.

EXAMPLE

Preparing example specimens

Figure 1:
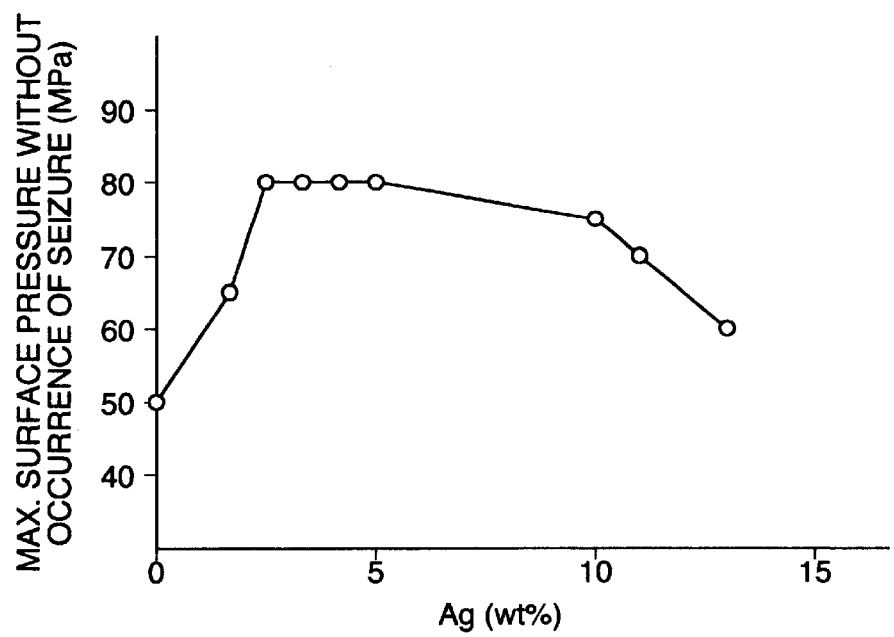
FIG. 1 is a graph showing a relationship between an Ag amount in the overlay and a maximum surface pressure without occurrence of seizure.

1. Steel plates (SPES), each coated with a copper plating film having a thickness of 8 $\mu$m were prepared.
2. A bearing alloy powder, which has a chemical composition of 6 wt % Sn and the balance of Cu, was spread on the respective steel plates.
3. The steel plates each having a powder layer were sintered in a reducing atmosphere furnace at 700° C. to 900° C. of temperature for 10 to 30 minutes.
4. Subsequently, the sintered plates were rolled by a rolling mill.
5. Process steps 3 and 4 were repeated once again to obtain bimetal plates each of which has a thickness of 1.5mm and each of which comprises a bearing alloy layer having a thickness of 0.35mm.
6. The respective bimetal plates were sheared and machined to obtain half shell bearing specimens each having an outer diameter of 56 mm and a width of 16 mm.
7. The specimens were subjected to a preliminary treatment of degreasing by an aqueous solvent, electrolysis degreasing and pickling in this order.
8. The respective pre-treated specimens was plated with Ag-plating having a thickness of 5 $\mu$m.
9. Finally, the Ag-plated specimens were further plated with an overlay having a thickness of 5 $\mu$m, respectively, so that a plural specimens of invention examples 1 to 7 and comparative examples 1 to 6 of which overlay compositions are shown in Table 1 were obtained.

Test

With regard to the invention and comparative examples of half shell bearings, a seizure test was carried out with utilization of a heated lubricant oil of VG22 at 100° C. of temperature and a mating shaft which was made of JIS S55 and had a surface roughness of 0.8 $\mu$m (Rmax).

In the test, the mating shaft was supported by example half shell bearings and rotated at a rate of 7200 rpm, wherein at first a running-in operation was conducted without load for one hour, thereafter the lubricant oil was supplied to the bearings and the mating shaft by a flow rate of 150 cc/min. and an initial bearing load of 10 MPa was provided to the mating shaft and the bearings. The bearing load was increased step-by-step in a manner that 10 MPa was accumulated every 10 minutes. While continuously rotating the mating shaft and increasing the bearing load step-by-step, when the temperature of the bearing back surface exceeded 200° C. or there occurred a slip of a driving belt due to a torque change, it was decided that there arose "seizure" at the sliding-contact portion. The results are shown in Table 1.

TABLE 1

|  |  | OVERLAY (chemical composition) (wt %) | MAX SURFACE PRESSURE WITHOUT OCCURRENCE OF SEIZURE (MPa) | MAX SURFACE PRESSURE WITHOUT OCCURRENCE OF FATIGUE (MPa) |
|---|---|---|---|---|
| INVENTION EXAMPLE | 1 | 2.8 Ag—Sn | 80 | 130 |
|  | 2 | 3.5 Ag—Sn | 80 | 130 |
|  | 3 | 4.2 Ag—Sn | 80 | 130 |
|  | 4 | 5.0 Ag—Sn | 80 | 130 |
|  | 5 | 10 Ag—Sn | 75 | 120 |
|  | 6 | 5.0 Ag—1.0 Cu—Sn | 80 | 135 |
|  | 7 | 3.5 Ag—2.0 Sb—Sn | 80 | 135 |
| COMPARATIVE EXAMPLE | 1 | pure Sn | 50 | 100 |
|  | 2 | 1.8 Ag—Sn | 65 | 120 |
|  | 3 | 11 Ag—Sn | 70 | 110 |
|  | 4 | 13 Ag—Sn | 60 | 80 |
|  | 5 | 2 Cu—Sn | 60 | 120 |
|  | 6 | 9 Sn—9In—Pb | 85 | — |

Referring to FIG. 1 which shows a relationship between an Ag amount in the overlay and a maximum surface pressure without occurrence of seizure, when the Ag amount is increased from zero to about 3 wt %, the maximum surface pressure rises from 50 MPa to 80 MPa. The maximum surface pressure is maintained highly from an amount range of from about 3 wt % to 5 wt %. When the Ag amount is increased from 5 wt % to 10 wt %, the maximum surface pressure is gradually reduced. When the Ag amount exceeds 10 wt %, the maximum surface pressure is significantly decreased. From the test results, it will be understood that the invention examples have substantially the same anti-seizure property as that of the conventional alloy of 9Sn-9In—Pb.

Regarding the same examples, a fatigue test was also carried out with utilization of a heated lubricant oil of VG22 at 100° C. of temperature.

In the fatigue test, the mating shaft was rotated at a rate of 7200 rpm, and wherein at first a running-in operation was conducted without load for one hour, thereafter the lubricant oil was supplied to the bearings and the mating shaft by a flow rate of 150 cc/min. and a predetermined bearing load was provided to the mating shaft and the bearings.

After a continuous rotation of the mating shaft for 20 hours, the inner surface of the respective specimen bearing was observed by eye. When no fatigue was observed on an example specimen, it was further subjected to the fatigue test under an increased bearing load. Fatigue resistance property was determined in terms of a maximum surface pressure without occurrence of fatigue. The test results are shown in Table 1.

Figure 2:
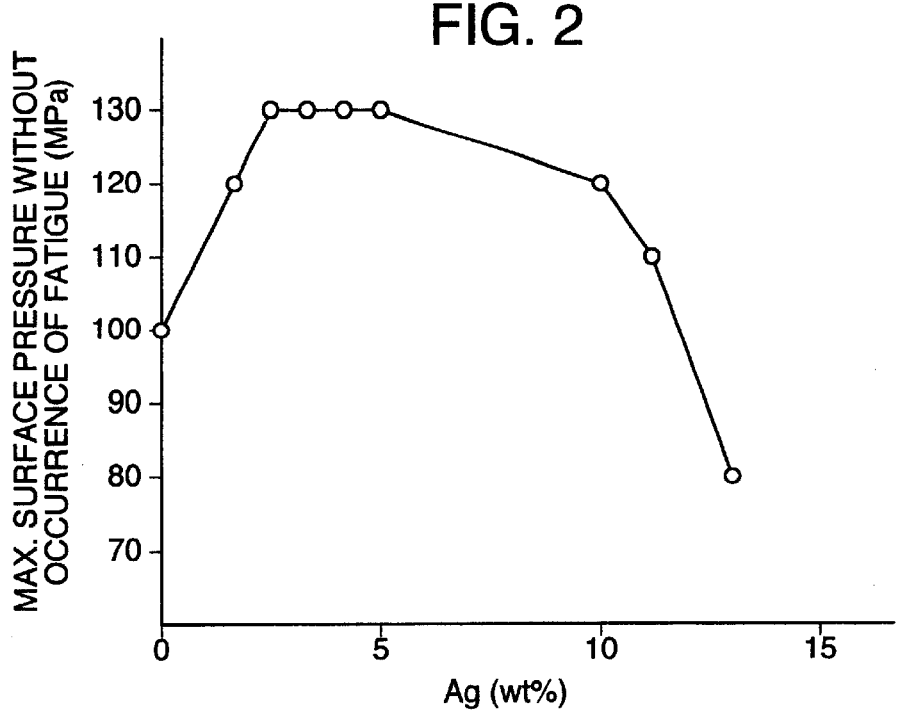
FIG. 2 is a graph showing a relationship between an Ag amount in the overlay and a maximum surface pressure without occurrence of fatigue.

Referring to FIG. 2 which shows a relationship between an Ag amount in the overlay and a maximum surface pressure without occurrence of fatigue, when the Ag amount is increased from zero to about 3 wt %, the maximum surface pressure rises from 100 MPa to 130 MPa. The maximum surface pressure is maintained highly from an amount range of from about 3 wt % to 5 wt %. When the Ag amount is increased from 5 wt % to 10 wt %, the maximum surface pressure is gradually reduced. When the Ag amount exceeds 10 wt %, the maximum surface pressure is significantly decreased. It is noted that the graph of FIG. 2 is similar to that of FIG. 1.

We claim:

1. A plain bearing comprising a back metal layer, a bearing alloy layer and an overlay which coats said bearing alloy layer, wherein said overlay is made of a lead-free tin-base alloy which consists essentially of, by weight, from more than 2% to 10% Ag, and balance of Sn and inevitable impurities.

2. A plain bearing according to claim 1, wherein said lead-free tin-base alloy consists essentially of, by weight, from more than 2.5% to 5% Ag, and balance of Sn and inevitable impurities.

3. A plain bearing according to claim 1, wherein said lead-free tin-base alloy consists essentially of, by weight, from more than 2% to 10% Ag, a total amount of 0.1% to 25% of one or more elements selected from the group consisting of Cu, Sb, Zn and Ni, and balance of Sn and inevitable impurities.

4. A plain bearing according to claim 1, wherein said lead-free tin-base alloy consists essentially of, by weight, from more than 2% to 10% Ag, a total amount of 0.1 to 25% of one or more elements selected from the group consisting of Cu, Sb and Ni, and balance of Sn and inevitable impurities.

5. A plain bearing comprising a back metal layer, a bearing alloy layer and an overlay which coats said bearing alloy layer, wherein said overlay is made of a lead-free tin-base alloy which consists of, by weight, from more than 2% to 10% Ag, optionally one or more elements selected from the group consisting of Cu, Sb and Ni in a total amount of 0.1 to 25% by weight, and balance of Sn and inevitable impurities.

6. The plain bearing of claim 5 wherein said Ag is present in an amount from more than 2.5% to 5%.

7. The plain bearing of claim 5 wherein said one or more optional elements is present in said lead-free tin-based alloy of said overlay.

8. The plain bearing of claim 5 wherein said one or more optional elements is not present in said lead-free tin-based alloy of said overlay.

9. The plain bearing according to claim 5 wherein said overlay comprises, in addition to said lead-free tin-based alloy, at least one of hard particles to improve wear resistance and particles of solid lubricant to decrease coefficient of friction.

* * * * *

(12) EX PARTE REEXAMINATION CERTIFICATE (7447th)
United States Patent
Kawachi et al.

(10) Number: US 6,357,919 C1
(45) Certificate Issued: Apr. 6, 2010

(54) PLAIN BEARING

(75) Inventors: Toshiaki Kawachi, Nagoya (JP); Hideo Tsuji, Nagoya (JP); Hideo Ishikawa, Nagoya (JP); Takayuki Shibayama, Nagoya (JP)

(73) Assignee: Daido Metal Company Ltd., Kita-Ku, Nagoya (JP)

Reexamination Request:
No. 90/007,615, Jul. 6, 2005

Reexamination Certificate for:
Patent No.: 6,357,919
Issued: Mar. 19, 2002
Appl. No.: 09/583,557
Filed: May 31, 2000

(30) Foreign Application Priority Data

Jun. 9, 1999 (JP) .......................................... 11-162347

(51) Int. Cl.
*F16C 33/06* (2006.01)

(52) U.S. Cl. ........................................ 384/276; 384/913
(58) Field of Classification Search ................... 384/276
See application file for complete search history.

(56) References Cited

U.S. PATENT DOCUMENTS 6,162,767 A 12/2000 Adam

FOREIGN PATENT DOCUMENTS

GB 2 321 468 A 7/1998

*Primary Examiner*—Jimmy G Foster

(57) ABSTRACT

A plain bearing comprising a back metal layer, a bearing alloy layer and an overlay which coats the bearing alloy layer. The overlay is made of a lead-free tin-base alloy which comprises from more than 2 wt % to 10 wt % Ag. The lead-free tin-base alloy may further comprise 0.1 wt % to 25 wt % of one or more elements selected from a group consisting of Cu, Sb, Zn and Ni.

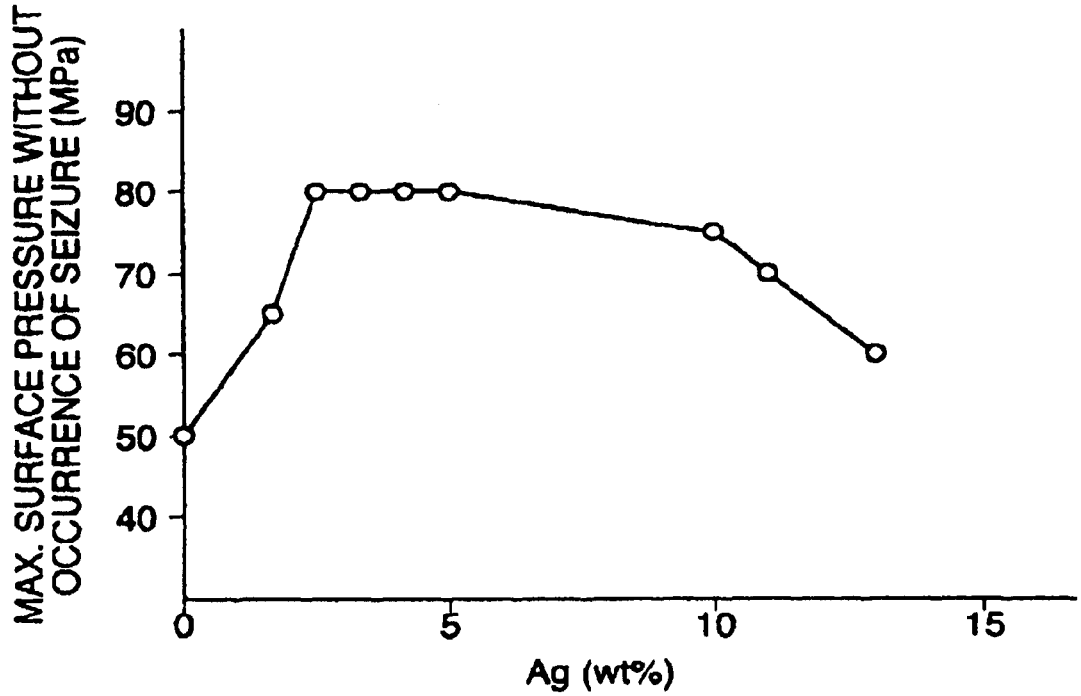

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 2 is cancelled.

Claims 1, 3–5 and 9 are determined to be patentable as amended.

Claims 6–8, dependent on an amended claim, are determined to be patentable.

New claims 10–17 are added and determined to be patentable.

1. A plain bearing comprising a back metal layer, a bearing alloy layer and an overlay which coats said bearing alloy layer,
   wherein said overlay is made of a lead-free tin-base alloy which consists essentially of, by weight,
   from more than [2%] *2.5%* to [10%] *5%* Ag, and
   balance of Sn and inevitable impurities.

3. A plain bearing according to claim 1, wherein said lead-free tin-base *overlay* alloy consists essentially of, by weight, from more than [2%] *2.5%* to [10%] *5%* Ag, a total amount of 0.1% to 25% of one or more elements selected from the group consisting of Cu, Sb, Zn and Ni, and balance of Sn and inevitable impurities.

4. A plain bearing according to claim 1, wherein said lead-free tin-base *overlay* alloy consists essentially of, by weight, from more than [2%] *2.5%* to [10%] *5%* Ag, a total amount of 0.1 to 25% of one or more elements selected from the group consisting of Cu, Sb and Ni, and balance of Sn and inevitable impurities.

5. A plain bearing comprising a back metal layer, a bearing alloy layer and an overlay which coats said bearing alloy layer, wherein said overlay is made of a lead-free tin-base alloy which consists of, by weight,
   from[more than 2%] *2.5%* to 10% Ag,
   optionally one or more elements selected from the group consisting of Cu, Sb and Ni in a total amount of 0.1 to 25% by weight, and
   balance of Sn and inevitable impurities,
   *wherein said overlay is directly formed on the bearing alloy layer.*

9. The plain bearing according to claim 5 wherein said overlay comprises, in addition to said lead-free tin-based alloy, at least one of hard particles to improve wear resistance and particles of solid lubricant to decrease coefficient of friction,
   wherein the hard particles are one or more hard particles selected from the group consisting of nitrides and carbides, and
   wherein the solid lubricant is one or more solid lubricants selected from the group consisting of $MoS_2$, BN, graphite and PTFE.

*10. The plain bearing according to claim 1 wherein said overlay has a thickness of 5 μm.*

*11. The plain bearing according to claim 1 wherein said overlay is directly formed on the bearing alloy layer.*

*12. A plain bearing comprising a back metal layer, a bearing alloy layer and an overlay which coats said bearing alloy layer,
   wherein said overlay is made of a lead-free tin-base alloy which consists essentially of, by weight,
   from more than 2.5% to 5% Ag, and
   balance of Sn and inevitable impurities;
   wherein said overlay is formed on the bearing alloy layer through an intermediate layer of Ag.*

*13. A plain bearing comprising a back metal layer, a bearing alloy layer and an overlay which coats said bearing alloy layer,
   wherein said overlay is made of a lead-free tin-base alloy which consists of, by weight,
   from more than 2% to 10% Ag, and
   balance of Sn and inevitable impurities,
   wherein said overlay is directly formed on the bearing alloy layer.*

*14. A plain bearing according to claim 13, wherein said lead-free tin-base alloy consists essentially of, by weight, from more than 2.5% to 5% Ag, and balance of Sn and inevitable impurities.*

*15. A plain bearing according to claim 13, wherein said lead-free tin-base alloy consists essentially of, by weight, from more than 2% to 10% Ag, a total amount of 0.1 to 25% of one or more elements selected from the group consisting of Cu, Sb, Zn and Ni, and balance of Sn and inevitable impurities.*

*16. A plain bearing according to claim 13, wherein said lead-free tin-base alloy consists essentially of, by weight, from more than 2% to 10% Ag, a total amount of 0.1 to 25% of one or more elements selected from the group consisting of Cu, Sb and Ni, and balance of Sn and inevitable impurities.*

*17. The plain bearing according to claim 13 wherein said overlay comprises, in addition to said lead-free tin-based alloy, at least one of hard particles to improve wear resistance and particles of solid lubricant to decrease coefficient of friction.*

* * * * *